Jan. 16, 1945.  D. H. SPITZLI  2,367,536
COVERING STRUCTURE
Filed Sept. 24, 1940
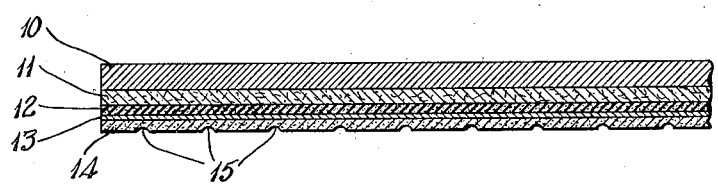
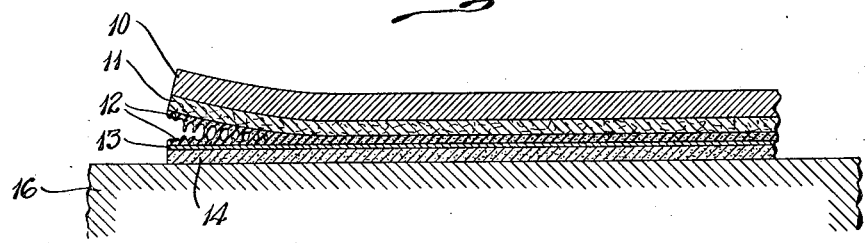
INVENTOR
DONALD H. SPITZLI
BY
ATTORNEY Patented Jan. 16, 1945

2,367,536

UNITED STATES PATENT OFFICE 2,367,536

COVERING STRUCTURE

Donald H. Spitzli, Summit, N. J., assignor to Congoleum-Nairn Inc., a corporation of New York Application September 24, 1940, Serial No. 358,091

15 Claims. (Cl. 154—49)

This invention relates to covering structure of sheet-like character suitable for covering floors, walls, furniture or the like or other rigid or structural surfaces. A typical covering structure of the character referred to may, for example, be a covering structure of the linoleum or felt base type and may comprise a sheet-like foundation member of strain-resistant material, such as a woven fabric, impregnated felt, or the like and integral with one side of the foundation member a decorative and wear-resistant surfacing material such as linoleum composition, paint or other molded or coating composition.

The present invention relates to covering structures which include a layer of permanently plastic material between the foundation member of the covering structure and a layer of cementitious material for bonding the covering structure to a subsurface, and the improvements of the present invention have to do with the interposition between the layer of permanently plastic material and the layer of cementitious material of a third or barrier layer as will be described in detail hereinbelow.

In my Patent No. 2,148,137 I have described a covering structure which comprises a foundation member and which has integral therewith a composite cementatory portion including a first layer of permanently plastic material and a second layer of cementitious material on the side of the first layer remote from the foundation member that is less plastic than the material of the first layer and preferably is normally non-sticky or at least is substantially less sticky than the material of the first layer. According to the present invention, at least from one point of view, covering structures of the character described in my aforesaid Patent No. 2,148,137 can be improved so that more full advantage may be taken of the layer of permanently plastic material and so that the range of materials used in covering structures having the advantages of the plastic layer may be materially extended.

As described in my said Patent No. 2,148,137 one of the advantages of including a layer of permanently plastic material in a covering structure of the character referred to is that the layer prevents movements of a subsurface to which the covering may be bonded from being communicated to the body portion of the covering structure with such force as to injure the body portion of the covering structure or to impair the bond between the foundation member of the covering structure and the subsurface. Another advantage of disposing a layer of permanently plastic material between the foundation member of a covering structure and a less plastic or relatively rigid cement for bonding the covering to a subsurface, is that the material of the permanently plastic layer normally has substantially less transverse or laminating strength than the transverse or laminating strength of the body portion of the covering structure as a whole or of the foundation member of the covering structure so that the body portion of the covering structure can be stripped from the subsurface to which it has been bonded by a more rigid cement with cleavage intermediate the thickness of or at one or the other of the surfaces of the permanently plastic layer.

By the expressions "laminating strength" or "transverse tensile strength," as used herein with reference to the several layers of the covering structure and the bond between the layers, is meant the ability to withstand forces tending to separate the covering structure at or within the layers into laminations. A measurement of this may be obtained by firmly bonding to a smooth flat support a strip of the covering cut to a predetermined width, and then, commencing at one end of the strip, applying a uniform pull at right angles to the flat support, noting the force required to separate or laminate the covering structure internally.

In the manufacture and installation of covering structures comprising a plastic layer it is desirable that the layer of plastic and deformable material be as thin as possible so as to minimize any tendency of the covering structure when installed to become indented, e. g. as a result of the weight of articles of furniture locally applied to covering structures installed on a floor.

It is a feature of this invention that a covering structure is afforded wherein a layer of permanently plastic material which is integral with the body portion of the covering structure has permanently integral therewith and interposed between it and a layer of substantially less plastic cementitious material for bonding the covering structure to a subsurface, a barrier layer that is distinct from the layer of permanently plastic material and from the layer of less plastic cementitious material. The barrier layer may take several different forms as will be pointed out more in detail hereinbelow. Thus the barrier layer may be a thin sheet of paper preferably sized to make it more impervious or it may be a layer of film forming material or a substantially continuous layer of finely divided material. The barrier sheet or layer may be incorporated in a covering structure that is preformed at the plant with a layer of normally non-sticky cementitious material on the back thereof or in a covering structure which is bonded to a subsurface by a hand spread cementitious material applied when the covering is laid.

The advantages of the structure above described wherein a barrier layer is interposed between the layer of permanently plastic material and the layer of normally less plastic cementitious material are several. One of these advantages is that the layer of permanently plastic material can be protected by the barrier layer so that continuity and uniformity of thickness of this layer in the covering structure may be assured even though the layer may be very thin. By covering the surface of the plastic layer that is remote from the foundation sheet of the covering structure with the barrier sheet or layer, the plastic layer can be protected against injury due to careless use of brushes in activating or applying overlying non-plastic cement that would impair the effectiveness of the layer as a cleavage layer and in permitting lateral movements of floor boards or the like without rupturing or buckling the decorative and wear-resistant surface layer of the covering structure. This is equally important whether the layer of normally less plastic cementitious material be applied at the factory in the manufacture of preformed coverings or be applied in situ when the floor covering is installed. Moreover, in manufacturing covering structures according to this invention including a barrier layer that covers the layer of permanently plastic material less allowance need be made for possible injury to the permanently plastic layer and it can be made less thick with resultant economy of manufacture and, what is even more important, with resultant minimizing of any tendency of the covering structure to become indented due to the presence therein of the relatively deformable material.

If a covering structure is made up at the plant with a layer of plastic material protected by a removable sheet which is removed when the covering is deposited on a hand spread adhesive, the layer of permanently plastic material has to be made excessively thick to permit removal of the removable sheet, and in removing the sheet there is risk of displacing or removing the material of the permanently plastic layer. The barrier layer according to this invention that is permanently integral with the layer of permanently plastic material overcomes such difficulties.

The barrier layer likewise may serve to protect the material of the plastic layer from adverse effects of solvent material used in activating the cementitious material that is used to bond the covering structure to a subsurface whether the barrier layer is permeable or impermeable to such solvent. Preferably, however, this barrier layer is substantially impermeable to such solvent when the permanently plastic layer is dissociable to substantial extent by the solvent used to activate the more rigid cement of the other layer.

The barrier layer likewise protects the layer of permanently plastic material from possible impairment as a result of contact with the material of the less plastic cementitious material due to migration of or chemical incompatibility of the ingredients of the layers. Moreover, as between certain materials used in the permanently plastic and less plastic cementitious layers, the bond between these layers can be improved by placing a barrier layer therebetween composed of or comprising material to which the permanently plastic layer and less plastic cementitious layer have greater tendency to adhere than they do to each other.

The inclusion of the barrier layer when incorporated in a covering structure comprising a permanently plastic layer and a layer of less plastic cementitious material for bonding the covering to a subsurface, also prevents the material constituting the permanently plastic layer from exuding through any cracks that may develop in the layer of less plastic cementitious material. Many cementitious materials used for bonding a covering structure to a subsurface are normally relatively rigid and may develop cracks therein and the permanently plastic material, especially in warm weather and under pressure, tends to exude through the cracks thereby diminishing the effectiveness of the permanently plastic layer. In preformed covering structures comprising a layer of cementitious material any such exuding of the plastic material causes the surface which is intended to be normally non-sticky to become excessively sticky.

The barrier layer is also of advantage in that it tends to prevent action on the material of the permanently plastic layer that tends to impair its plastic character The foregoing and further purposes, features, and advantages of this invention will be apparent in connection with the following description of certain exemplary embodiments of this invention which are described in order to illustrate, and afford a better understanding of, this invention.

While the body portion may take several different forms the body portion may comprise a sheet-like foundation and integral with one surface thereof a layer of wear-resistant and decorative material such as linoleum composition. Integral with the back of the foundation sheet is a thin layer of permanently plastic material. On the side of the layer of permanently plastic material remote from the body portion is a layer of substantially less plastic cementitious material. Between the layer of permanently plastic material and the layer of less plastic cementitious material the barrier layer is disposed. The layer of permanently plastic material, the barrier layer and the layer of normally less plastic cementitious material are integrally bonded together and to the body portion of the covering structure. The entire structure of this embodiment of this invention is preformed at the factory and is ready-to-lay inasmuch as the normally less plastic cementitious material is adapted to be activated to render it sticky as by application of water or other solvent thereto so that it can be readily bonded to a subsurface.

The layer of cementitious material of lesser plasticity may be composed of a mixture of clay 55%, lignin 42%, and glycerine 3%. The term "lignin" refers to an article of commerce obtained by evaporation of waste sulphite liquor from the wood pulp industry. The cementitious material is normally non-sticky and is adapted to be activated by water to impart stickiness thereto. By referring to a cementitious material as "normally non-sticky" it is understood that the material in its normal condition is so non-sticky that, without activation it will not afford a permanent bond between the covering structure and a subsurface. Preferably the normally non-sticky material is such that the covering can be rolled up into rolls without having the non-sticky cement adhere to any portion of the decorative surface of the covering with which it comes in contact. However, a material possessing, under normal conditions, a slight stickiness which is insufficient, without activation of the material, to securely bond the covering to a subsurface but which is undesirable for rolling and shipment although it can be overcome by a thin application of soap, wax or the like is to be considered normally non-sticky. The clay-lignin cementitious material while normally non-sticky is adapted to be activated by water to impart thereto adhesiveness, and after activation is adapted to set to a rigid or relatively rigid cement and to firmly bond the covering structure to a subsurface when the covering structure is laid in place.

Generally speaking, the material of the non-sticky cementitious layer should preferably retain its non-sticky characteristics under normal conditions of storing, shipping and merchandising and under varying conditions of humidity. Moreover, the material should preferably harden to a rigid or relatively rigid cement. It is also preferable that this material be not affected by alkalis, such as alkalis that are encountered when the covering is laid directly on cement.

For the layer of permanently plastic material a mixture of rubber and rosin is used, the rubber preferably being crepe or smoked sheet rubber. Preferably there is added to the mixture a suitable rubber anti-oxidant such as phenyl-alpha-naphthylamine or di-beta-naphthyl-para-phenylene-diamine to prolong the duration of the plastic property of the rubber or rubber-rosin mixture. Fillers or pigments may be employed if desired, also softeners for the rubber or rosin or both. Among the preferred softeners which have been used are the zinc chloride double salt of phenyl hydrazine, mixtures of light mineral oil and sulphonated petroleum products and petrolatum. The following is illustrative of a satisfactory material for use as the permanently normally plastic layer:

|  | Percent |
|---|---|
| Rubber | 43.0 |
| Rosin | 43.0 |
| Anti-oxidant | .2 |
| Softener | 5.8 |
| China clay | 8.0 |

The word "plastic" as used hereinabove is understood herein to apply to any material (including a single substance or composition) which, notwithstanding substantial deformation after application, preserves the bond between the body portion of the covering structure and the barrier and normally non-sticky cementitious layers. In this connection it is immaterial whether upon deformation of the material the particles thereof merely stretch without breaking apart or break apart and then by self-healing become adherent again. Moreover, the plastic material may ar may not possess elasticity, namely, a tendency to return to its original form, although a certain amount of elasticity is normally desirable. In referring to the plastic material as "permanently" plastic, it is meant that the material retains its plasticity for a long interval of time in contrast to a material which hardens to a relatively rigid mass upon evaporation of volatile solvents, for example. In the usual case the permanently plastic layer should retain its plasticity during the normal life of the covering structure under usual conditions of use. The rubber-rosin composition above described is a suitable permanently plastic composition.

The barrier layer which is interposed between the permanently plastic rubber-rosin layer and the less plastic clay-lignin layer may be a thin sheet of paper that is sized on the side adjacent the rubber-rosin plastic layer with a size that is substantially non-reactive with the rubber-rosin composition and which is adapted to form a strong bond between the paper and the rubber-rosin composition. Such a size may have lignin as a base and may comprise about 0 to 25% of clay on the dry weight of the lignin. The paper containing the size is also adapted to afford a strong bond between it and the layer of clay-lignin cement. In order that the covering structure may be flexed without wrinkling or rupturing the barrier layer, the paper sheet is preferably embossed with a plurality of shallow grooves e. g. spaced about ⅛ inch apart and disposed parallel to the axis of the roll of the covering structure as rolled up for shipment or storage. When the barrier layer has low elasticity such as paper, it is preferable to deform the barrier layer so that its total length along the surface of the layer is substantially greater than its overall length.

The application of the layers of plastic and less plastic material and of the barrier layer to the covering structure may be accomplished in any suitable way, e. g., in a heat-plasticized or in a solvent-plasticized condition as described in my aforesaid patent. The material of the permanently plastic layer preferably is spread so that the weight of the applied material will be about .05 to about 0.2 pound per square yard of the covering structure, e. g. about 0.1 pound per square yard.

After the layer of permanently plastic material has been made integral with the body portion of the covering structure the paper carrying the sizing applied thereto may then be deposited on the exposed surface thereof either immediately or after an interval of time. If the paper is sized predominantly on one side the sizing, if compatible with the rubber-rosin composition, is positioned so as to face this composition.

The layer of less plastic and normally substantially non-sticky material can be applied directly to the side of the paper sheet remote from the plastic layer. For this purpose a paste may be prepared comprising two to three parts of the above mentioned clay-lignin-glycerine mixture and one part of water. This composition is doctored or otherwise spread onto the back of the covering structure leaving, for example, about .5 to about 1.5 pounds per square yard of this cement. Upon evaporation of the water a uniform layer of non-sticky, non-tacky cementitious material integral with the back of the paper sheet is obtained.

The structure above described is adapted to be laid merely by water activation of the clay-lignin cementitious material. This can be done as by applying water thereto by means of a brush. After the clay-lignin material has been rendered tacky the covering structure can be laid and pressed into place. the covering thus installed comprising the layer of permanently plastic material and the barrier sheet that is interposed between the plastic material and the cementitious material that bonds the covering structure to the subsurface.

The inclusion of the barrier layer or sheet in the above described exemplary embodiment of this invention has the various advantages hereinabove mentioned and in addition it may be mentioned that the positioning of the sizing carried by the paper barrier sheet immediately adjacent the permanently plastic layer minimizes absorption of the permanently plastic material or components thereof into the paper sheet.

As a further illustrative embodiment of this invention, the structure of the preceding example may be modified by substituting for the rubber-rosin material of the permanently plastic layer a water-soluble or water-dissociable permanently plastic material which may for example comprise glue 100 parts, glycerine 400 parts, calcium chloride 37 parts and water 137 parts. The layer of normally less plastic and normally non-sticky cementitious material may be the clay-lignin composition described in connection with the preceding example. As a barrier layer a thin film of elastic, distensible and non-tacky rubber composition, e. g. composed of 70% rubber latex 3 parts, filler 2 parts, and anti-oxidant and vulcanizing agent 0.1 part. The anti-oxidant may be any of the anti-oxidants above mentioned in connection with the description of the rubber-rosin composition and the vulcanizing agent any commonly used with latex compound. The complete covering structure may be made by applying the first layer, thinned somewhat with water to render it spreadable, to the back of the foundation member of the covering structure, drying this layer, applying the rubber barrier layer thinned with water as necessary, removing the water from the barrier layer, and then applying and drying the clay-lignin layer in the manner above described.

The resulting product has the advantages of the covering structure previously described. In addition it is to be noted that while the permanently plastic layer is water-dissociable, it can be used in conjunction with a normally non-sticky cementitious material that is adapted to be activated by water in applying the covering structure to a subsurface. If the barrier layer were not employed this would not be desirable inasmuch as the layer of permanently plastic material would be dissociated upon application of water to the layer of normally non-sticky cementitious material with resultant removal or displacement of the permanently plastic material or blending thereof with the non-sticky layer thereby detracting from the effectiveness and advantages of the layer of permanently plastic material.

The employment of a barrier layer between a layer of permanently plastic material and a layer of less plastic material, both of which are dissociable by some non-aqueous solvent may be illustrated in connection with the following example. The permanently plastic layer may be a layer of rubber-rosin composition such as that described hereinabove. The layer of less plastic cementitious material may be cementitious material of the type which is described in Patent No. 1,991,007 dated February 12, 1934, for Adhesive composition and which comprises paracumarone resin and Portland cement together with a small amount of a fibrous filler material such as asbestine. Such a cementitious material can be activated by heat or by a solvent such as a mixture of acetone and methyl ethyl ketone in the proportion of about 1 to 4 for rendering it spreadable and after having been spread can be reactivated with this solvent mixture. Such a cementitious material, as mentioned in said Patent No. 1,991,007, is especially suitable for use in bonding a covering structure to a subsurface where dampness may be encountered. The solvent that is used in connection with the resin-Portland cement cementitious material not only is adapted to activate the resin-Portland cement material but also is adapted to soften and dissociate the rubber-rosin material of the permanently plastic layer. Likelihood of any such softening and dissociation of the permanently plastic layer may be minimized by interposing between these layers a layer of material that is substantially unaffected by the solvent e. g. a substantially continuous layer of finely divided mica flakes. The structure above described can be manufactured by first applying the rubber-rosin permanently plastic material to the back of the foundation member of the covering. Powdered mica flakes can then be applied to the permanently plastic and sticky material in a thin layer. The resin-Portland cement layer thinned with a suitable solvent can then be applied over the mica flakes and the solvent evaporated. The layer of finely divided mica flakes should be substantially continuous so as to constitute a barrier between the plastic and less plastic layers but should not be so thick as to excessively weaken the bond between the plastic and less plastic layers.

It is not essential that the covering structure be preformed at the factory with the layer of less plastic material integral therewith. Thus each of the covering structures above described by way of example may be made at the factory without the layer of less plastic material preformed integral therewith. In such case the body portion of the covering structure can be made and sold comprising the permanently plastic layer protected by the barrier layer permanently integral therewith, and the covering structure can be completed when the covering structure is to be laid by bonding the covering structure to a subsurface using a hand spread cement applied on the job either to the subsurface or to the back of the covering structure. Where the covering structure is produced at the factory without the layer of less plastic cement, the barrier sheet should preferably be non-sticky as this term is used herein and should not be affected by atmospheric moisture so as to become sticky. Thus for example when the barrier layer is composed of paper sized with a lignin size as mentioned above, it is preferable to apply the size only to the side of the paper that is adjacent the permanently plastic material. With this precaution the covering structure comprising a barrier sheet composed of paper and a lignin size can be rolled for storage and shipment even though the layer of normally non-sticky cementitious material is omitted as made up at the plant. Moreover, such a covering structure can be laid on a floor, for example, without employing any cementitious material to bond it to a subsurface. In such case it is preferable not to have a cementitious material that is activatable to impart stickiness thereto preformed on the covering structure inasmuch as such an adhesive would be likely to become activated accidentally, e. g. by water (when a water activatable cementitious material is employed) causing adhesion in local areas and buckling in non-bonded areas.

In addition to the foregoing examples of the practice of this invention it is apparent that this invention may be embodied in other structures. The foundation member that is used may consist of a woven fabric such as burlap or a felted fabric such as a bitumen impregnated flooring felt, as is well known in the art. Moreover other sheet-like strain-resistant materials or compositions may be used which preferably have such properties as resistance to stretching, to tearing and to distortion by compression. The foundation member may also comprise one or more layers as may be desired such as a layer of woven fabric combined with a layer of impregnated felt, for example.

Instead of linoleum composition the surfacing material may consist of a paint, lacquer, enamel or other suitable molded or coating composition having a drying oil base or other suitable base, such as a synthetic resin or a soluble cellulose derivative, and which is wear-resistant or decorative or both. The use of drying oils, such as linseed, China-wood, perilla, etc. as a base for wear-resistant and decorative compositions is well known as is likewise the use of soluble cellulose derivatives, such as cellulose nitrate, cellulose acetate and the like. Synthetic resins of the phenolic or alkyd type may also be used as or in the binder or vehicle base. Such base materials may be mixed with suitable fillers, pigments and the like, in a variety of compositions that may be used in the practice of this invention. In lieu of carrying a decorative and wear-resistant material as a separate layer integral with the foundation member, a decorative and wear-resistant material may be impregnated in the fibrous foundation member so as to be presented at the upper surface thereof.

In addition to the foregoing, the body portion of a covering structure embodying this invention may consist of other sheet-like coverings such as a fibrous sheet of felt, for example, without an upper surface layer, the felt being either unimpregnated or impregnated with a suitable waterproofing material such as a bituminous waterproofing material. Such a covering structure, namely consisting of an unsurfaced fibrous sheet of felt as a body portion together with a permanently plastic layer, a less plastic layer and a barrier layer therebetween, can for example be used by itself or in conjunction with a linoleum or felt base covering either cemented or otherwise laid over the felt after the felt has been laid in place. As a further modification both faces of such an impregnated or unimpregnated felt may carry layers of plastic and less plastic materials with the barrier layer therebetween according to this invention.

With regard to the layer of permanently plastic material, a wide variety of materials and compositions may be employed. In general the permanently plastic layer, from the point of view of preventing the rupture of the body portion upon expansion and contraction of a substructure to which the covering is bonded, should be of sufficient thickness and plasticity to maintain the bond between the body portion of the covering structure and the layer of less plastic cementitious material upon gradual lateral movement of the less plastic layer relative to the body portion of the covering while maintaining substantially unimpaired the strength of the bond between the body portion of the covering structure and the less plastic layer. In other words the "coherent shearing" strength of the plastic layer should be less than the lateral tensile strength of the body portion of the covering structure. The thickness of the layer of permanently plastic material should be less than about 0.15 mm. to minimize tendency of covering structure to indent and preferably should be less than about .08 mm. in thickness.

From the point of view of insuring desired cleavage of the covering structure at or within the layer of permanently plastic material, the transverse bonding strength of this layer afforded by its adhesion to adjoining layers and its internal laminating strength, should be substantially less than the transverse tensile strength or laminating strength of the foundation member of the covering structure and preferably of the body portion as a whole so as to insure cleavage of the covering structure at or within the layer of permanently plastic material rather than within the body portion of the covering structure.

In my Patent No. 2,148,137 I have mentioned that I prefer to use as the permanently plastic layer rubber-rosin composition varying from about 67% of rubber to 33% of rosin to about 40% of rubber to 60% of rosin. I have also described how such properties as the coherent strength, the adhesive strength and degree of plasticity of such a composition can be varied dependent upon the proportion of rubber to rosin and depending upon the inclusion of softening material such as mineral oil or of fillers such as china clay. I have also described the employment of other base materials such as resins, bitumen, drying oils and the like and have pointed out that the inclusion of rubber preferably to the content of about 30% is preferable in the composition of the permanently plastic layer.

With regard to the layer of less plasticity it is preferable to employ a cementitious material that is normally relatively rigid inasmuch as such cementitious materials are adapted to afford a secure and uniform bond between the covering structure and a subsurface and have high resistance to indentation caused by localized pressure exerted on the covering structure. The expression "relatively rigid" is employed herein to indicate that the cementitious material when hardened has a hardness and resistance to distortion substantially equal to or greater than these properties of the body portion of the covering structure. It is not essential, however, that the cementitious material be relatively rigid inasmuch as advantages of this invention are afforded when the layer in question is more rigid (less plastic) than the layer of permanently plastic material. When the less plastic layer is preformed at the factory it is also desirable that the less plastic layer be normally non-sticky as this term has been defined hereinabove and if not wholly non-sticky at least normally less sticky that the material of the permanently plastic layer which is usually normally permanently sticky as well as normally permanently plastic. The less plastic layer may be activatable by water or by other solvent. Hereinabove an example of a water activatable cementitious material and of a solvent activatable cementitious material have been given and additional examples are set forth in my said Patent No. 2,148,137. More generally the disclosure contained in my Patent No. 2,148,137 as to the composition and properties of the permanently plastic layer, of the less plastic cementitious layer and of the body portion of the covering structure both in themselves and in relation to each other is to be regarded as incorporated herein.

With regard to the character of the barrier layer that is interposed between the layers of permanently plastic material and less plastic cementitious material it can be varied widely.

In general it should be a thin flexible substantially continuous barrier compatible with and distinct from the materials with which it may be placed in contact. A preferred material for the barrier layer is a thin sheet of paper. Preferably the paper is made of sulfite or kraft stock so that the paper while thin and flexible will be quite impervious and tough. In order to increase the impermeability of the paper or to improve its capacity to bond with adjoining material or materials, e. g. the layer of permanently plastic material, the paper is preferably sized on one side or the other or throughout with a suitable sizing material. The character of the sizing material will depend somewhat upon the character of the material with which the barrier layer will come in contact. For example for contact with a layer of permanently plastic material composed principally of rubber and rosin a size comprising such materials as lignin, casein, glue or the like is satisfactory. For contact with a permanently plastic material such as glue plasticized with glycerine and a hygroscopic material, a size such as chlorinated rubber may advantageously be used.

The sizing that is used should also be selected with a view to the character of layer of less plastic cementitious material with which the barrier layer will come in contact. If the layer of less plastic cementitious material is preformed at the factory on the back of the covering structure, the sizing should be compatible with such cementitious material. If the less plastic cementitious material is applied on the job when the covering is installed the sizing for the barrier paper sheet should be compatible with cements of the usual types that are on the market.

In addition to paper other thin sheet materials may be used as, or as a base for, the barrier layer with or without sizing or bonding materials applied to the fiber, e. g. sheet cellulose, metal foil or the like.

The barrier layer may also consist of or comprise film forming material, a wide variety of film forming materials being suitable. The use of rubber as a film forming material together with an anti-oxidant and filler material has been mentioned above. In addition other film forming materials such as cellulose esters, cellulose ethers, various natural and synthetic resins, bitumens and the like may be used either alone or in conjunction with finely divided filler material, plasticizers, and the like. Typical film forming materials which may be used are plasticized chlorinated rubber, plasticized nitrocellulose, plasticized ethyl cellulose, alkyd resin, etc.

The film forming material that is used as a barrier layer depends for attaining preferred results on the character of the material with which it may come in contact. In this connection, the foregoing comments regarding the character of sizing material that may be used in connection with a barrier layer comprising a paper sheet base are applicable to the film forming materials. It is of more importance, however, in the case of a barrier layer consisting primarily of film forming material that the film forming material be substantially non-dissociable in a solvent that is used in activating the normally less plastic cementitious material, whether this cementitious material is in the form of a preformed backing for the covering structure or is applied by hand on the job. Film forming material used as a barrier layer according to this invention may be applied when thinned with a volatile solvent by spreading, spraying or the like or may be applied in a heat softened condition when the film forming material is sufficiently thermoplastic to permit such heat softening.

The barrier layer may also be composed of various finely divided materials which may be mineral, vegetable or synthetic in character. Examples of such materials, in addition to the mica flakes mentioned above, are aluminum powder, vermiculite, powdered cork, finely ground vulcanized rubber and the like. Materials such as these are generally quite insoluble in and non-reactive with materials with which they may come in contact such as the ingredients of the permanently plastic and less plastic layers and solvents used in activating the less plastic layer to render the same more sticky. However, such materials when used in small amount tend to become embedded in the permanently plastic layer so as to detract somewhat from its plasticity and so as to permit the material of the permanently plastic layer to strike therethrough. For this reason substantially sheet-like materials such as paper, or a film provided by a film forming material, are regarded as preferable.

The barrier layer may be a single film, membrane, sheet or the like or may be composite in character. For example, the barrier layer may be a thin sheet of paper which carries on one or both sides thereof a substantially continuous film of some film forming material, e. g. a film forming material of the character above mentioned. Alternatively the paper may have different coating or sizing materials carried on opposite sides thereof. Similarly to prevent a pulverulent material from striking into the layer of permanently plastic material, the permanently plastic material may have a coating of film forming material applied thereto and pulverulent material can be applied to one side of the protective film. By employing as a barrier layer a composite sheet or layer the material presented on opposite sides can be different and each made appropriate for contact with the particular composition with which it will come in contact. For example in a covering structure comprising a permanently plastic layer of rubber and rosin and a normal non-sticky layer comprising clay and lignin a barrier layer can be interposed between these layers which comprises paper sized on the surface facing the permanently plastic layer with lignin and sized on the opposite surface with chlorinated rubber.

Somewhat more generally the barrier lever whether in the form of a fibrous sheet such as paper, a film forming material, a finely divided material or the like, should be composed of material that is harder, namely, is less readily deformed, than the material of the permanently plastic layer, reference being made to the material itself whether in the form of a sheet, a film, or individual particles. Preferably also the material of the barrier layer should be inert to materials with which the barrier layer may come in contact, that is, should not deleteriously affect the adjoining materials or be deleteriously affected by the adjoining materials as a result of chemical action or otherwise. In this connection the barrier layer may serve to separate incompatible materials such as a layer of permanently plastic rubber-rosin material and a layer of less plastic cementitious material such as sodium silicate.

When the barrier layer is interposed between a layer of permanently plastic material and a layer of less plastic material that is activatable by a solvent for imparting increased stickiness thereto it is preferable that the material of the barrier layer be less readily dissociable by the action of the solvent than the material of the less plastic cementitious layer so that the barrier layer will be resistant to excessive softening by the action of the solvent used to activate the less plastic cementitious material.

The material of the barrier layer should be such that it can be laid down in a thin unbroken layer that is flexible and will not wrinkle or tear with normal flexure of the linoleum.

The material of the barrier layer should be adapted to be bonded integrally with the materials of the layers that are placed in contact therewith. The material of the barrier layer should likewise have sufficient integral laminating strength to resist lamination under normal service conditions.

With regard to cleavage of the covering structure when it is to be stripped from a subsurface to which it has been bonded, it has been mentioned above that the layer of permanently plastic material is preferably so constituted that cleavage will be at or within this layer in preference to the body portion of the covering structure. Furthermore, while cleavage may occur at or within the barrier layer, especially when such layer comprises dry, flakelike or pulverulent materials, such occurrence normally is not desirable if the full benefits of this invention are to be secured, it being preferred that cleavage take place only at or within the layer of permanently plastic material.

In order to afford a clearer understanding of this invention, illustrative embodiments thereof are shown in the accompanying drawing, wherein—

Fig. 1 is a cross section of a preformed covering embodying this invention, and

Fig. 2 is a cross section of a covering structure embodying this invention, one portion being bonded to a subsurface and another portion being removed from the subsurface.

In the embodiment shown in Fig. 1 there is a surface layer 10 of wear-resistant and decorative material which may for example be linoleum composition and which is integral with a fibrous foundation member 11 which may be impregnated felt for example. Integral with the undersurface of the foundation member 11 is a layer 12 of permanently plastic material. Bonded to the other side of the layer 12 is the barrier layer 13 which may for example be a thin sheet of sized paper. Bonded to the under side of the layer or sheet 13 is a layer 14 of normally non-sticky cementitious material. The latter layer preferably includes channels or grooves 15 of a reticulated character on the back of the covering.

The covering structure shown in Fig. 1 is a preformed ready-to-lay article that can be rolled up, shipped, stored and merchandised in the usual way. It can be readily installed by cutting it to desired size, applying a suitable solvent (preferably water) as by means of a brush to activate the normally non-sticky adhesive and impart thereto adhesiveness, and then pressing the covering structure in place. The layer 14 will thereafter set to form a permanent bond with the subsurface to which it has been applied.

The preformed covering just described and illustrated in Fig. 1 may be bonded to the surface of a substructure 16 to form the covering structure shown in Fig. 2. The cementitious material 14 is bonded to the surface of the substructure 16. The barrier layer 13 is disposed between the adhesive layer and the permanently plastic layer 12, the permanently plastic layer being adapted to permit movements of the cementitious layer transmitted thereto by movements of the substructure 16 relative to the foundation sheet 11 without buckling or rupturing the foundation sheet (or the decorative and wear-resistant layer 10) and without substantially impairing the bond between the foundation sheet and the surface of the substructure. To illustrate the action of the permanently plastic layer as a cleavage layer when it is desired to strip the covering from a subsurface, one end of the covering is shown in Fig. 2 as being pulled away from the subsurface. The laminating or transverse tensile strength of the bond afforded by the permanently plastic layer between the barrier layer and the foundation being less than that of the foundation sheet and less than that of the cementitious layer 14 cleavage occurs at or within the layer 12 of permanently plastic material. Preferably the cleavage occurs at or adjacent the side of the layer 12 that is adjacent the layer 13 so that as much as possible of the layer 12 will be pulled away with the body portion of the covering structure. After the covering structure has been stripped the cementitious layer 14 remaining on the subsurface can readily be removed by applying thereto a solvent therefor (preferably water) coupled with light mechanical treatment to disrupt the layer 14 together with any remaining portions of the barrier layer 13 and the permanently plastic layer 12.

Alternatively the covering structure shown in Fig. 2 may be partially made at the factory without the layer 14 of cementitious material preformed therewith, the structure being completed on the job by applying the cementitious material by hand to the surface of the substructure and then bonding the covering in place.

While the utility and advantages of the incorporation of a layer of permanently plastic material in a covering structure of the character described are set forth in my Patent No. 2,148,137 and such covering structures broadly considered are covered thereby, the improvements herein described and claimed are regarded as new in the art and have the features of utility and advantage described in detail hereinabove. And while the present improvements have been described in connection with certain specific examples it is to be understood that this has been done for illustrative purposes merely and that the practice of this invention may vary within the scope of my invention as defined by the language of the following claims.

I claim:

1. A covering structure of the character described for covering floors, walls, furniture and the like and presenting a decorative and wear-resistant surface, said structure comprising a body portion, a first layer of permanently normally plastic material, a second layer of normally substantially less plastic cementitious material on the side of said first layer remote from the body portion and a thin, flexible, sheet-like barrier layer interposed between said first and second layers and distinct therefrom, said body portion and said layers being bonded together to form an integral covering structure.

2. A covering structure of the character described for covering floors, walls, furniture and the like and presenting a decorative and wear-resistant surface, said structure comprising a body portion, a first layer of permanently normally plastic material, a second layer of normally less plastic cementitious material on the side of said first layer remote from the said body portion and a thin flexible, sheet-like barrier layer interposed between said first and said second layers and distinct therefrom, said body portion and said layers being bonded together to form an integral covering structure, the material of said first layer being of sufficient thickness and plasticity to maintain substantially unimpaired the bond between said body portion and said second layer upon gradual lateral movement of said second layer relatively to said body portion and the material of said barrier layer being of substantially harder consistency than the material of said permanently plastic layer.

3. A covering structure of the character described for covering floors, walls, furniture and the like and presenting a decorative and wear-resistant surface, said structure comprising a body portion, a first layer of permanently normally plastic and permanently normally sticky adhesive material, a second layer of normally less plastic and normally substantially non-sticky cementitious material on the side of said first layer remote from said body portion, and a thin flexible sheet-like barrier layer interposed between said first and second layers and distinct therefrom, said body portion and said layers being bonded together to form an integral covering structure, the bonding strength afforded by the material of said first layer being substantially less than the transverse tensile strength of said body portion, and the material of said barrier layer being normally substantially of harder consistency and less sticky than the material of said first layer.

4. A preformed covering structure of the character described for covering floors, walls, furniture and the like which comprises a body portion that presents a decorative and wear-resistant surface, and a composite cementatory portion, said composite cementatory portion comprising a first layer of permanently normally plastic adhesive material integral with said body portion, a second layer of normally substantially less plastic and normally non-sticky cementitious material on the side of said first layer remote from said body portion and adapted to be activated by a solvent to impart stickiness thereto, and interposed between said first and second layers a thin, sheet-like barrier layer of flexible material adapted to substantially completely separate said first and second layers, the material of said barrier layer being substantially less dissociable by a solvent adapted to activate the cementitious material of said second layer to impart stickiness thereto than said cementitious material of said second layer.

5. A preformed covering structure according to claim 4 wherein the cementitious material of said second layer is activatable by water to impart stickiness thereto and the material of said barrier layer is substantially non-dissociable by water.

6. A covering structure of the character described for covering floors, walls, furniture and the like which comprises a body portion presenting a wear-resistant and decorative surface and comprising a fibrous foundation sheet, said structure comprising a first layer of permanently normally plastic material, a second layer of substantially less plastic cementitious material on the side of said first layer remote from said foundation sheet, and a thin sheet of paper interposed between said first and second layers, said body portion, said layers and said sheet being bonded together in the form of an integral covering structure.

7. A covering structure according to claim 6 wherein said paper carries a sizing material that is substantially inert to the material of said first layer and to the material of said second layer.

8. A covering structure according to claim 6 wherein said paper sheet has a plurality of adjacent deformations therein so that at least in one direction the length of said sheet along the surface thereof is substantially greater than the overall length of the covering structure.

9. A covering structure of the character described for covering floors, walls, furniture and the like which comprises a body portion presenting a wear-resistant and decorative surface and comprising a fibrous foundation sheet, said structure comprising a first layer of permanently normally plastic material, a second layer of substantially less plastic cementitious material, and a barrier layer of film forming material interposed between said first and second layers of substantially harder consistency than the material of said first layer, said body portion and said layers being bonded together to form an integral covering structure.

10. A covering structure of the character described for covering floors, walls, furniture and the like which comprises a body portion presenting a wear-resistant and decorative surface and comprising a foundation sheet, said structure comprising a first layer of permanently normally plastic material, a second layer of substantially less plastic cementitious material, and a barrier layer of finely divided solid material interposed between said first and second layers and distinct therefrom, said body portion and said layers being bonded together to form an integral covering structure.

11. A covering structure of the character described for covering floors, walls, furniture and the like which comprises a body portion including a fibrous foundation sheet and a layer of linoleum composition integral with one side of said foundation sheet and which comprises integrally bonded with the other side of said foundation sheet a first layer of permanently normally plastic material, a second layer of normally less plastic cementitious material water activatable to impart thereto adhesiveness, and thin flexible sheet material interposed between said first and second layers and distinct therefrom.

12. A covering structure of the character described for covering floors, walls, furniture and the like which comprises a body portion including a fibrous foundation sheet and a layer of linoleum composition integral with one side of said foundation sheet and which comprises integrally bonded with the other side of said foundation sheet a first layer of permanently normally plastic material comprising rubber, a second layer of relatively rigid cementitious material comprising lignin and clay, and a paper sheet interposed between said first and second layers.

13. A covering structure according to claim 6 wherein said permanently plastic material contains rubber and said paper carries a sizing material that is substantially inert to rubber.

14. A covering structure according to claim 6 wherein said permanently plastic layer is composed predominantly of a mixture of rubber and rosin and said sheet of paper is sized with a material that is substantially inert to said rubber-rosin mixture and that is presented by the side of said sheet of paper facing said layer.

15. A covering structure according to claim 9 wherein said second layer is composed of cementitious material activatable by a solvent to impart stickiness thereto and wherein said barrier layer is composed of material that is substantially insoluble in said solvent.

DONALD H. SPITZLI.